US008161171B2

(12) United States Patent
Maes

(10) Patent No.: US 8,161,171 B2
(45) Date of Patent: Apr. 17, 2012

(54) SESSION INITIATION PROTOCOL-BASED INTERNET PROTOCOL TELEVISION

(75) Inventor: Stephane Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 51 days.

(21) Appl. No.: 11/943,101

(22) Filed: Nov. 20, 2007

(65) Prior Publication Data

US 2009/0132717 A1 May 21, 2009

(51) Int. Cl.
*G06F 15/16* (2006.01)

(52) U.S. Cl. ......... 709/228; 709/219; 709/220; 709/227

(58) Field of Classification Search .................. 709/228
See application file for complete search history.

(56) References Cited

U.S. PATENT DOCUMENTS

| | | | |
|---|---|---|---|
| 5,414,812 | A | 5/1995 | Filip et al. |
| 5,699,513 | A | 12/1997 | Feigen et al. |
| 5,786,770 | A | 7/1998 | Thompson |
| 5,850,517 | A | 12/1998 | Verkler et al. |
| 5,867,665 | A | 2/1999 | Butman et al. |
| 6,115,690 | A | 9/2000 | Wong |
| 6,119,104 | A | 9/2000 | Brumbelow |
| 6,128,645 | A | 10/2000 | Butman et al. |
| 6,157,941 | A | 12/2000 | Verkler et al. |
| 6,163,800 | A | 12/2000 | Ejiri |
| 6,230,271 | B1 | 5/2001 | Wadlow et al. |
| 6,272,556 | B1 | 8/2001 | Gish |
| 6,275,857 | B1 | 8/2001 | McCartney |
| 6,336,138 | B1 | 1/2002 | Caswell et al. |
| 6,374,305 | B1 | 4/2002 | Gupta et al. |
| 6,466,984 | B1 | 10/2002 | Naveh et al. |
| 6,496,864 | B1 | 12/2002 | McCartney |
| 6,578,159 | B1 | 6/2003 | Kitagawa et al. |
| 6,611,812 | B2 | 8/2003 | Hurtado et al. |

(Continued)

FOREIGN PATENT DOCUMENTS

EP 2 034 748 A1 3/2009

OTHER PUBLICATIONS

U.S. Appl. No. 11/848,347, filed Aug. 31, 2007, Office Action mailed Oct. 29, 2009, 12 pages.

(Continued)

*Primary Examiner* — Yves Dalencourt

(74) *Attorney, Agent, or Firm* — Kilpatrick Townsend & Stockton LLP

(57) ABSTRACT

Video on demand (VoD) and other video streaming and delivery mechanisms are provided using a messaging protocol (e.g., a session initiation protocol (SIP))-based approach that builds upon existing service delivery platforms. In one example, SIP functionality is extended to provide the ability to control and alter a delivery mode of a content stream, such as to change a playback mode or quality of service, by providing such requests as part of the instruction or payload of existing SIP messages, or by providing new SIP messages. Using SIP allows for third party control, such as by IPTV applications, which is not provided by current Real Time Streaming Protocol (RTSP)-based systems. SIP also can establish a peer-to-peer connection between a client and a SIP-enabled content server to allow the client to directly control the media stream. As an advantage over RTSP, SIP provides for bi-directional messaging between SIP end-points.

12 Claims, 9 Drawing Sheets

U.S. PATENT DOCUMENTS

| | | | | |
|---|---|---|---|---|
| 6,748,570 | B1 | 6/2004 | Bahrs et al. | |
| 6,792,605 | B1 | 9/2004 | Roberts et al. | |
| 6,868,413 | B1 | 3/2005 | Grindrod et al. | |
| 6,978,348 | B2 | 12/2005 | Belknap et al. | |
| 6,985,939 | B2 | 1/2006 | Fletcher et al. | |
| 7,003,578 | B2 | 2/2006 | Kanada et al. | |
| 7,042,988 | B2 | 5/2006 | Juitt et al. | |
| 7,043,538 | B2 | 5/2006 | Guedalia et al. | |
| 7,111,060 | B2 | 9/2006 | Araujo et al. | |
| 7,114,146 | B2 | 9/2006 | Zhang et al. | |
| 7,114,148 | B2 | 9/2006 | Irving et al. | |
| 7,143,092 | B1 | 11/2006 | Arroyo et al. | |
| 7,146,616 | B2 | 12/2006 | Dorner et al. | |
| 7,185,342 | B1 | 2/2007 | Carrer et al. | |
| 7,194,482 | B2 | 3/2007 | Larkin et al. | |
| 7,222,334 | B2 | 5/2007 | Casati et al. | |
| 7,272,625 | B1 | 9/2007 | Hannel et al. | |
| 7,340,508 | B1 | 3/2008 | Kasi et al. | |
| 7,409,707 | B2 | 8/2008 | Swander et al. | |
| 7,411,943 | B2 | 8/2008 | Kittredge et al. | |
| 7,415,010 | B1 | 8/2008 | Croak et al. | |
| 7,433,838 | B2 | 10/2008 | Welsh et al. | |
| 7,447,793 | B2 | 11/2008 | Morioka | |
| 7,454,399 | B2 | 11/2008 | Matichuk | |
| 7,461,062 | B2 | 12/2008 | Stewart et al. | |
| 7,472,349 | B1 | 12/2008 | Srivastava et al. | |
| 7,519,076 | B2 | 4/2009 | Janssen et al. | |
| 7,580,994 | B1 | 8/2009 | Fiszman et al. | |
| 7,617,521 | B2 | 11/2009 | Maes | |
| 7,630,953 | B2 | 12/2009 | Stauber et al. | |
| 7,716,310 | B2 * | 5/2010 | Foti | 709/220 |
| 7,752,634 | B1 | 7/2010 | Saxena et al. | |
| 7,779,445 | B2 * | 8/2010 | Ellis | 725/93 |
| 7,853,647 | B2 | 12/2010 | Maes | |
| 7,860,490 | B2 | 12/2010 | Maes | |
| 7,873,316 | B2 | 1/2011 | Maes | |
| 2002/0087674 | A1 | 7/2002 | Guilford et al. | |
| 2002/0099738 | A1 | 7/2002 | Grant | |
| 2002/0101879 | A1 | 8/2002 | Bouret | |
| 2002/0111848 | A1 | 8/2002 | White | |
| 2002/0143819 | A1 | 10/2002 | Han et al. | |
| 2002/0144119 | A1 | 10/2002 | Benantar | |
| 2002/0178122 | A1 | 11/2002 | Maes | |
| 2002/0184373 | A1 | 12/2002 | Maes | |
| 2002/0191774 | A1 | 12/2002 | Creamer et al. | |
| 2002/0194388 | A1 | 12/2002 | Boloker et al. | |
| 2002/0198719 | A1 | 12/2002 | Gergic et al. | |
| 2002/0198991 | A1 | 12/2002 | Gopalakrishnan et al. | |
| 2003/0003953 | A1 | 1/2003 | Houplain | |
| 2003/0023953 | A1 | 1/2003 | Lucassen et al. | |
| 2003/0046316 | A1 | 3/2003 | Gergic et al. | |
| 2003/0061268 | A1 | 3/2003 | Moerdijk et al. | |
| 2003/0061404 | A1 | 3/2003 | Atwal et al. | |
| 2003/0115203 | A1 | 6/2003 | Brown et al. | |
| 2003/0115260 | A1 | 6/2003 | Edge | |
| 2003/0131076 | A1 | 7/2003 | Nelson et al. | |
| 2003/0154233 | A1 | 8/2003 | Patterson | |
| 2003/0191769 | A1 | 10/2003 | Crisan et al. | |
| 2003/0208539 | A1 | 11/2003 | Gildenblat et al. | |
| 2003/0217044 | A1 | 11/2003 | Zhang et al. | |
| 2003/0229812 | A1 | 12/2003 | Buchholz | |
| 2004/0015547 | A1 | 1/2004 | Griffin et al. | |
| 2004/0015578 | A1 | 1/2004 | Karakashian et al. | |
| 2004/0024720 | A1 | 2/2004 | Fairweather | |
| 2004/0064528 | A1 | 4/2004 | Meredith et al. | |
| 2004/0068586 | A1 | 4/2004 | Xie et al. | |
| 2004/0110493 | A1 | 6/2004 | Alvarez et al. | |
| 2004/0128546 | A1 | 7/2004 | Blakley et al. | |
| 2004/0139319 | A1 | 7/2004 | Favazza et al. | |
| 2004/0161090 | A1 | 8/2004 | Digate et al. | |
| 2004/0176988 | A1 | 9/2004 | Boughannam | |
| 2004/0221005 | A1 | 11/2004 | Albaugh et al. | |
| 2005/0015340 | A1 | 1/2005 | Maes | |
| 2005/0021670 | A1 | 1/2005 | Maes | |
| 2005/0054287 | A1 | 3/2005 | Kim | |
| 2005/0086197 | A1 | 4/2005 | Boubez et al. | |
| 2005/0086297 | A1 | 4/2005 | Hinks | |
| 2005/0091156 | A1 | 4/2005 | Hailwood et al. | |
| 2005/0125696 | A1 | 6/2005 | Afshar et al. | |
| 2005/0132086 | A1 | 6/2005 | Flurry et al. | |
| 2005/0228984 | A1 | 10/2005 | Edery et al. | |
| 2005/0239485 | A1 | 10/2005 | Kundu et al. | |
| 2005/0249190 | A1 | 11/2005 | Birch | |
| 2005/0249344 | A1 | 11/2005 | Mueller et al. | |
| 2005/0267979 | A1 | 12/2005 | Bailey | |
| 2006/0014688 | A1 | 1/2006 | Costa et al. | |
| 2006/0041669 | A1 | 2/2006 | Bemmel et al. | |
| 2006/0080117 | A1 | 4/2006 | Carr et al. | |
| 2006/0116912 | A1 | 6/2006 | Maes | |
| 2006/0117109 | A1 | 6/2006 | Maes | |
| 2006/0143686 | A1 | 6/2006 | Maes | |
| 2006/0164902 | A1 | 7/2006 | Fung | |
| 2006/0165060 | A1 | 7/2006 | Dua | |
| 2006/0178898 | A1 | 8/2006 | Habibi | |
| 2006/0190600 | A1 | 8/2006 | Blohm et al. | |
| 2006/0212574 | A1 | 9/2006 | Maes | |
| 2006/0256774 | A1 | 11/2006 | Rigaldies et al. | |
| 2006/0272028 | A1 | 11/2006 | Maes | |
| 2006/0282856 | A1 | 12/2006 | Errico et al. | |
| 2006/0291507 | A1 | 12/2006 | Sarosi et al. | |
| 2007/0005770 | A1 | 1/2007 | Kramer et al. | |
| 2007/0011191 | A1 | 1/2007 | Otokawa et al. | |
| 2007/0011322 | A1 | 1/2007 | Moiso | |
| 2007/0061397 | A1 | 3/2007 | Gregorat et al. | |
| 2007/0100831 | A1 | 5/2007 | Cox | |
| 2007/0100981 | A1 | 5/2007 | Adamczyk et al. | |
| 2007/0112574 | A1 | 5/2007 | Greene | |
| 2007/0118618 | A1 * | 5/2007 | Kisel et al. | 709/219 |
| 2007/0150480 | A1 | 6/2007 | Hwang et al. | |
| 2007/0150936 | A1 | 6/2007 | Maes | |
| 2007/0201376 | A1 | 8/2007 | Marshall-Wilson | |
| 2007/0203841 | A1 | 8/2007 | Maes | |
| 2007/0204017 | A1 | 8/2007 | Maes | |
| 2007/0233883 | A1 | 10/2007 | De Lutiis et al. | |
| 2007/0239866 | A1 | 10/2007 | Cox et al. | |
| 2007/0271554 | A1 | 11/2007 | Fletcher et al. | |
| 2007/0276907 | A1 | 11/2007 | Maes | |
| 2007/0280226 | A1 | 12/2007 | Sonalkar et al. | |
| 2007/0291859 | A1 | 12/2007 | Maes | |
| 2008/0013533 | A1 | 1/2008 | Bogineni et al. | |
| 2008/0025243 | A1 | 1/2008 | Corneille et al. | |
| 2008/0080479 | A1 | 4/2008 | Maes | |
| 2008/0109853 | A1 * | 5/2008 | Einarsson et al. | 725/62 |
| 2008/0151918 | A1 * | 6/2008 | Foti | 370/410 |
| 2008/0162637 | A1 | 7/2008 | Adamczyk et al. | |
| 2008/0168523 | A1 | 7/2008 | Ansari et al. | |
| 2008/0186845 | A1 | 8/2008 | Maes | |
| 2008/0189401 | A1 | 8/2008 | Maes | |
| 2008/0228919 | A1 | 9/2008 | Doshi et al. | |
| 2008/0232567 | A1 | 9/2008 | Maes | |
| 2008/0235230 | A1 | 9/2008 | Maes | |
| 2008/0235327 | A1 | 9/2008 | Maes et al. | |
| 2008/0235354 | A1 | 9/2008 | Maes | |
| 2008/0235380 | A1 | 9/2008 | Maes | |
| 2008/0275883 | A1 | 11/2008 | Ashraf et al. | |
| 2008/0288966 | A1 | 11/2008 | Maes | |
| 2008/0301135 | A1 | 12/2008 | Alves et al. | |
| 2008/0307108 | A1 | 12/2008 | Yan et al. | |
| 2009/0006360 | A1 | 1/2009 | Liao et al. | |
| 2009/0015433 | A1 | 1/2009 | James et al. | |
| 2009/0034426 | A1 * | 2/2009 | Luft et al. | 370/252 |
| 2009/0112875 | A1 | 4/2009 | Maes | |
| 2009/0119303 | A1 | 5/2009 | Rio et al. | |
| 2009/0125595 | A1 | 5/2009 | Maes | |
| 2009/0187919 | A1 | 7/2009 | Maes | |
| 2009/0193057 | A1 | 7/2009 | Maes | |
| 2009/0193433 | A1 | 7/2009 | Maes | |
| 2009/0201917 | A1 | 8/2009 | Maes et al. | |
| 2009/0228584 | A1 | 9/2009 | Maes et al. | |
| 2009/0306834 | A1 | 12/2009 | Hjelm et al. | |
| 2009/0328051 | A1 | 12/2009 | Maes | |
| 2010/0049640 | A1 | 2/2010 | Maes | |
| 2010/0049826 | A1 | 2/2010 | Maes | |
| 2010/0058436 | A1 | 3/2010 | Maes | |
| 2010/0077082 | A1 | 3/2010 | Hession et al. | |
| 2011/0125909 | A1 | 5/2011 | Maes | |

2011/0125913 A1 5/2011 Maes
2011/0126261 A1 5/2011 Maes
2011/0134804 A1 6/2011 Maes

OTHER PUBLICATIONS

U.S. Appl. No. 11/951,500 filed Dec. 6, 2007, Office Action mailed Sep. 22, 2009, 24 pages.
U.S. Appl. No. 11/951,500, filed Dec. 6, 2007, Final Office Action mailed Mar. 30, 2010, 26 pages.
U.S. Appl. No. 11/877,129, filed Oct. 23, 2007, Office Action mailed Sep. 28, 2009, 15 pages.
U.S. Appl. No. 11/877,129, filed Oct. 23, 2007, Final Office Action mailed Mar. 29, 2010, 17 pages.
U.S. Appl. No. 11/926,738, filed Oct. 29, 2007, Office Action mailed Feb. 24, 2010, 12 pages.
U.S. Appl. No. 12/019,299, filed Jan. 24, 2008, Office Action mailed Mar. 31, 2010, 13 pages.
U.S. Appl. No. 11/024,160, dated Dec. 2004, Maes.
Andrews, Tony et al, Business Process Execution Language for Web Services, Version 1.1, BEA Systems, International Business Machines Corporation, SAP AG, Siebel Systems, May 5, 2003, 31 pages.
Liberty Architecture Overview, Liberty Alliance Project Version 1.1, Piscataway New Jersey, Jan. 15, 2003, 44 pages.
Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.
Maes, Stephanie, Multi-modal Web IBM Position W3C/Wap Workshop, IBM Research Human Language Technologies, downloaded http://www.w3.org on May 26, 2003, 9 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, downloaded http://www.linktionary.com/policy.html on Aug. 2, 2004, 4 pages.
Seely, Scott, "XML and Web Services Security: Understanding WS-Security", Microsoft Corporation, 2002.
Simpson et al, Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm on May 26, 2003, 5 pages.
Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.
Thomas Manes, Anne, "Registering a Web Service in UDDI", 2003.
U.S. Appl. No. 11/848,347, filed Aug. 31, 2007, Final Office Action mailed May 10, 2010, 15 pages.
U.S. Appl. No. 11/877,129, filed Oct. 23, 2007, Advisory Action mailed Jun. 3, 2010, 2 pages.
U.S. Appl. No. 11/926,738, filed Oct. 29, 2007, Final Office Action mailed Jun. 29, 2010, 12 pages.
U.S. Appl. No. 11/951,500, filed Dec. 6, 2007, Advisory Action mailed Jun. 24, 2010, 2 pages.
U.S. Appl. No. 10/855,999, filed May 28, 2004, Office Action dated Jun. 24, 2010, 20 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 page.
U.S. Appl. No. 10/855,999, filed May 28, 2004, Office Action dated May 1, 2008, 9 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
Maretzke, Michael, "Jain Slee Technology Overview", <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet", <http://java.sun.com/products/jain/JSLEE—SIPSerylet.pdf, 2003, 13 pages.
The Parlay Group, "Specifications", <http://web.archive.org/web/20050114014707/www.parlay.org/specs/index.asp>, Jan. 14, 2005, 2 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Office Action mailed Jan. 24, 2011, 16 pages.
U.S. Appl. No. 10/855,999, filed May 28, 2004, Final Office Action dated Jan. 5, 2011, 19 pages.
U.S. Appl. No. 11/123,468, filed May 5, 2005, Advisory Action dated Jan. 18, 2011, 2 pages.
U.S. Appl. No. 12/364,642, filed Feb. 3, 2009, Office Action dated Dec. 20, 2010, 18 pages.
U.S. Appl. No. 11/357,653, filed Feb. 16, 2000, Office Action dated Jan. 20, 2011, 18 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
Burger, E. et al., "Deploying CCXML for Application-Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Romellini, C. et al., "CCXML: The Power of Standardization," Loquendo, Sep. 27, 2005.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Office Action mailed Sep. 30, 2010, 19 pages.
U.S. Appl. No. 11/877,129, filed Oct. 23, 2007, Notice of Allowance mailed Aug. 5, 2010, 6 pages.
U.S. Appl. No. 11/951,500, filed Dec. 6, 2007, Office Action mailed Sep. 1, 2010, 30 pages.
U.S. Appl. No. 12/019,299, filed Jan. 24, 2008, Final Office Action mailed Oct. 6, 2010, 20 pages.
U.S. Appl. No. 10/856,588, filed May 28, 2004, Advisory Action dated Jan. 5, 2010, 3 pages.

U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004 , Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/070,317, filed Mar. 1, 2005, Final Office Action dated Sep. 27, 2010, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 24, 2009, 19 pages.
U.S. Appl. No. 11/123,468 filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Final Office Action dated Nov. 10, 2010, 18 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/939,705, filed Nov. 14, 2007, Office Action mailed Oct. 4, 2010, 21 pages.
International Search Report and Written Opinion of PCT/US2010/037074 mailed Jun. 1, 2011, 16 pages.
U.S. Appl. No. 11/848,347, filed Aug. 31, 2007, Final Office Action mailed Mar. 7, 2011, 21 pages.
U.S. Appl. No. 11/848,347, filed Aug. 31, 2007, Advisory Action mailed May 23, 2011, 3 pages.
U.S. Appl. No. 11/926,738, filed Oct. 29, 2007, Final Office Action mailed Mar. 17, 2011, 13 pages.
U.S. Appl. No. 11/926,738, filed Oct. 29, 2007, Advisory Action mailed May 25, 2011, 3 pages.
U.S. Appl. No. 11/951,500, filed Dec. 6, 2007, Final Office Action mailed Apr. 14, 2011, 33 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/024,160, filed Dec. 27, 2004, Final Office Action dated Jun. 1, 2011, 11 pages.
U.S. Appl. No. 11/939,705, filed Nov. 14, 2007, Final Office Action mailed Mar. 17, 2011, 21 pages.
U.S. Appl. No. 12/019,335, filed Jan. 24, 2008, Office Action mailed May 23, 2011, 18 pages.
U.S. Appl. No. 12/544,459, filed Aug. 20, 2009, Office Action mailed Mar. 2, 2011, 10 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.

* cited by examiner

SESSION INITIATION PROTOCOL-BASED INTERNET PROTOCOL TELEVISION

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the delivery of multimedia content. In particular, the invention relates to the control and delivery of video over an IP-based network.

As high speed digital connections become more common, applications and services are increasingly being offered over such connections. For example, an increasing number of people are transferring their telephony services to broadband-based technologies, such as Voice over IP (VoIP), which provide for the initiating and routing of voice conversations over the Internet or another IP-based network. An increasing number of people are also receiving video such as "cable" television over a broadband connection. One technology for delivering digital television service is Internet Protocol Television (IPTV), which delivers high-quality multi-channel television and streaming video content using an Internet Protocol over an IP-based network, instead of using traditional broadcast or cable technologies. The IPTV content can be played not only on a personal computer or laptop, but can be displayed on a television, cell phone, portable media player, PDA, etc.

Today IPTV typically is delivered using a protocol such as the Real Time Streaming Protocol (RTSP) as well as other such protocols. None of these approaches are based on the session initiation protocol (SIP) or a protocol that separates session control and/or signaling from transport. This lead to problems as, for example, SIP-based devices cannot take full advantage of IPTV and other types of control mechanisms for multimedia data with, for example, VCR-like functionality. As a result it also is difficult to allow a SIP or HTTP/SIP application, for example, to provide IPTV-like services, at best simply serving content catalogs and not much more. Similarly, networks such as IMS designed for SIP cannot directly use IPTV as part of the SIP/IP IMS architecture. The exchange has to be treated as purely network-based, which defeats some of the design principles of IMS. Also, RTSP is a stateful protocol that does not utilize a session ID, such that a permanent TCP connection is not needed, but instead utilizes RTSP messages sent between the client and server. For multicasting video content, a protocol such as the Internet Group Management Protocol (IGMP) is typically used for a linear IPTV service delivery, wherein each host and application desiring to be part of a multicast group must use IGMP to indicate such desire. Adjacent routers must also use this protocol to communicate. Other protocol specifications may be used by some (e.g. for mobile broadcasting), but they all suffer similar issues.

These protocols tend to be complex, and require specific architectures. For companies such as telecommunications companies, which are already losing revenue to cable companies who are now offering telephony services, it would be desirable to be able to offer ITPV using existing telecommunications technologies and architectures, without the need for extensive upgrades and more complex systems. Further, there are services that are not offered by protocols such as RTSP, such as third party control of a stream between a client and a server, that it would be desirable to be able to offer to a customer or third party vendor.

BRIEF SUMMARY OF THE INVENTION

Systems and methods in accordance with various embodiments of the present invention can overcome these and other deficiencies in existing media content delivery systems. A signaling or session control system, utilizing an appropriate messaging protocol and which is separated from the delivery of media, allows a client device to directly control the delivery of content from a media server, allowing the client device to obtain VCR-function style control over a media stream from the media server and exchange quality of service information, regardless of whether the media content is ultimately stored or buffered on the client device. This signaling system can include or be based on, for example, the session initiation protocol (SIP). The system also can work in a peer to peer environment, or can work via a third party call control of a media session. One embodiment includes a SIP based IPTV solution, such as an IPTV solution where signaling is decoupled from the delivery of media, and which allows for real-time VCR type control of the stream and the collection of streaming statistics (e.g., QoS of stream).

In one embodiment, a service delivery device utilizes such a messaging protocol to communicate with a media server and with a client device. The service device can receive a request from any of a number of client devices to initiate a content delivery session for a client device. The service delivery device then can send the request to a content application if necessary, such as to authenticate or bill for the delivery, and passes the request on to the media server. Upon receiving the request message using the messaging protocol, the media server begins streaming or otherwise delivering the requested content. The service delivery device can receive additional requests from a client during a session to alter an aspect of the delivery stream. For example, a user of a client device might want to play, pause, reverse, forward, fast forward, fast reverse, or stop the stream from the media server. The service delivery device then passes the request onto the media server using the messaging protocol so that the media server can alter the stream appropriately.

Embodiments as discussed herein can take advantage of a number of deployment models, such as in SIP where there can be a client to server deployment (which can include a peer to peer or real client to real server deployment), and a client to server (using SIP and RTP) and server to source deployment. Embodiments also can utilize a third party multimedia call control, such as a B2B UA or call control enabler.

The media content can be any appropriate content, such as Internet Protocol Television (IPTV) content. Also, the media server can be any appropriate media server, such as a Real Time Streaming Protocol (RTSP) media server, and a messaging protocol-enabled RTSP gateway can be used to receive the requests from the service delivery device and send a corresponding RTSP request to the media server in response thereto. Information regarding the delivery of content can be contained in a header of the initial messaging protocol message and any subsequent messaging protocol message. Alternatively, information regarding the delivery of content can be contained in a messaging protocol request specific to the delivery of content.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Figure 1A:
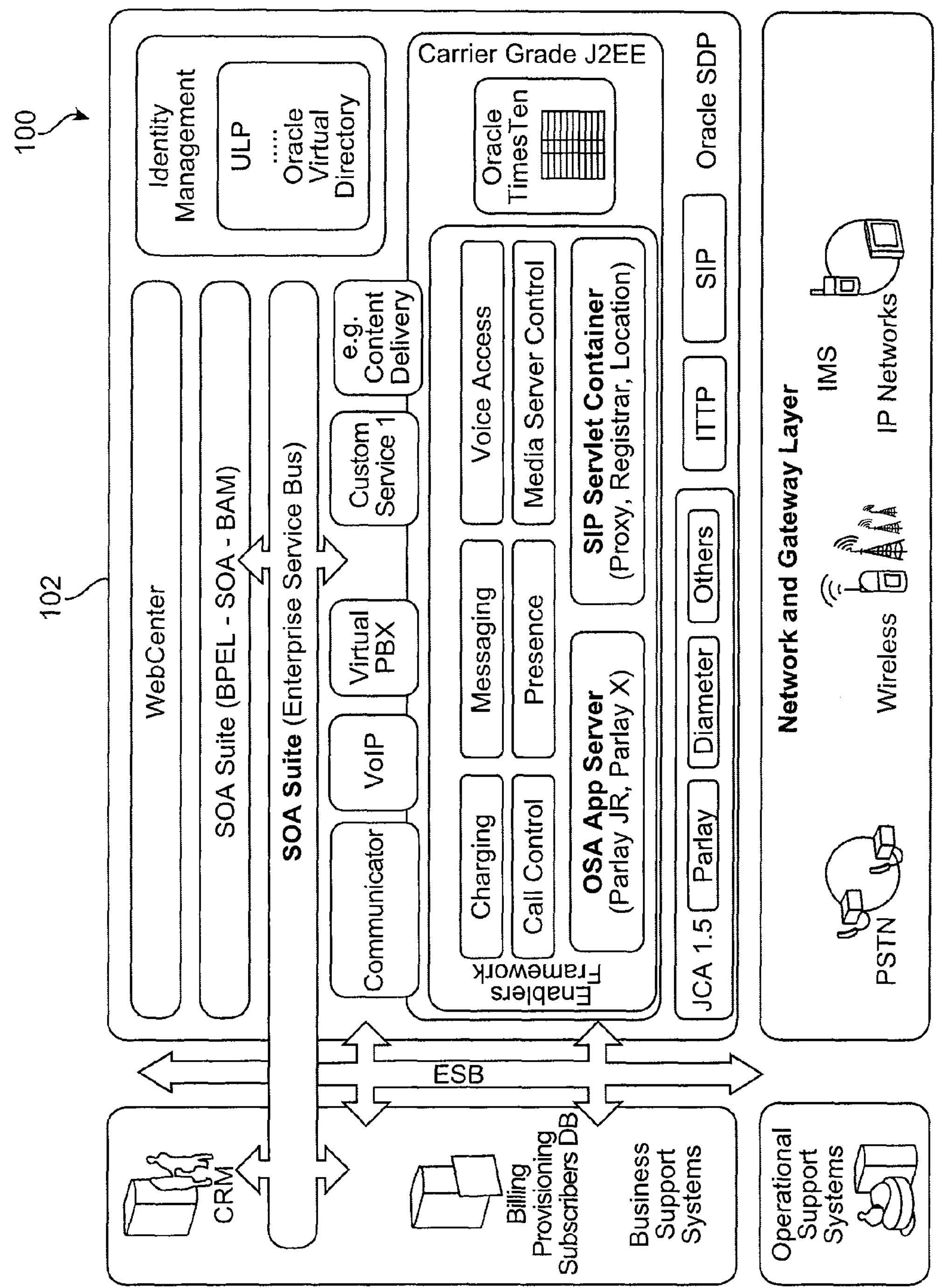
FIGS. 1(*a*) and 1(*b*) illustrate a service delivery platform-based architecture that can be used with various embodiments of the present invention.

Systems and methods in accordance with various embodiments can overcome the aforementioned and other deficiencies in existing multimedia delivery systems by providing a signaling or session control system based approach to IPTV, and media streaming in general, where processing is performed on the stream and not on downloaded files or buffered buckets of streams. The stream can be processed directly using a messaging protocol such as the Session Initiation Protocol (SIP), for example, instead of a protocol such as RTSP that is presently used for broadcasting information. Such an approach allows video streams to be driven using SIP requests, such as is used for VoIP and other multimedia exchanged, using existing service delivery platforms and other such architecture. Traditionally, SIP allows for functionality such as starting, stopping, pausing, and muting (e.g., via the Session Description protocol (SDP) (e.g. exchange of mismatched SDPs)) a content stream, as well as selecting an appropriate codec (e.g., MPEG-2, H.264/MPEG4 AVC, Windows® media player codec, etc.) and redirecting the stream. Through slight extensions to SIP messaging, IPTV can be controlled via SIP, and can offer functionality such as forward, fast forward, reverse, fast reverse, pause, and record. Using SIP also allows for third party control, such as by a television listing application that can direct a media server to stream content to a client device.

SIP can also be used to establish a peer-to-peer connection between a client device and a content server, for example, to allow the client to directly control the media stream. SIP has an advantage over RTSP for such purposes, as SIP provides for bi-directional messaging between SIP endpoints, while RTSP is a one-directional protocol wherein a media server can either play or record data, with the direction indicated at the setup of the media stream. Both endpoints can be controlled in a full duplex/bi-directional stream. A bidirectional VCR stream, for example, allows for functions such as real-time video calls. To further explain the differences from existing systems, in peer-to-peer models one peer can see what the other peer sees, or what is being played, without the ability to perform functions such as playback or reverse, unless that peer is locally storing or buffering the information on the receiving side. In an approach in accordance with one embodiment, data can remain stored only on the sending side, but can be controlled from the receiving side. In such a case, the sender behaves as a media server for the stream.

In the case of SIP, for example, a third party multimedia call control enabler can be used that allows a third party application to control the multimedia stream. Such functionality cannot easily be achieved with a traditional IPTV solution, at least not within a Web-type application based on SIP and HTTP. Embodiments in accordance with the present invention can allow a web application (e.g., SIP or converged SIP+HTTP) to drive/control the behavior of the streamed data, including VCR-type functionality. In third party and peer to peer implementations, for example, statistics can be exchanged regarding the quality of the stream, such as via a SIP client to server or client to application approach. So that other measures can be taken to correct a pause/replay buffer, logic for the application can utilize the third party multimedia call control, or the client or server (e.g., in client/server mode).

Figure 1B:
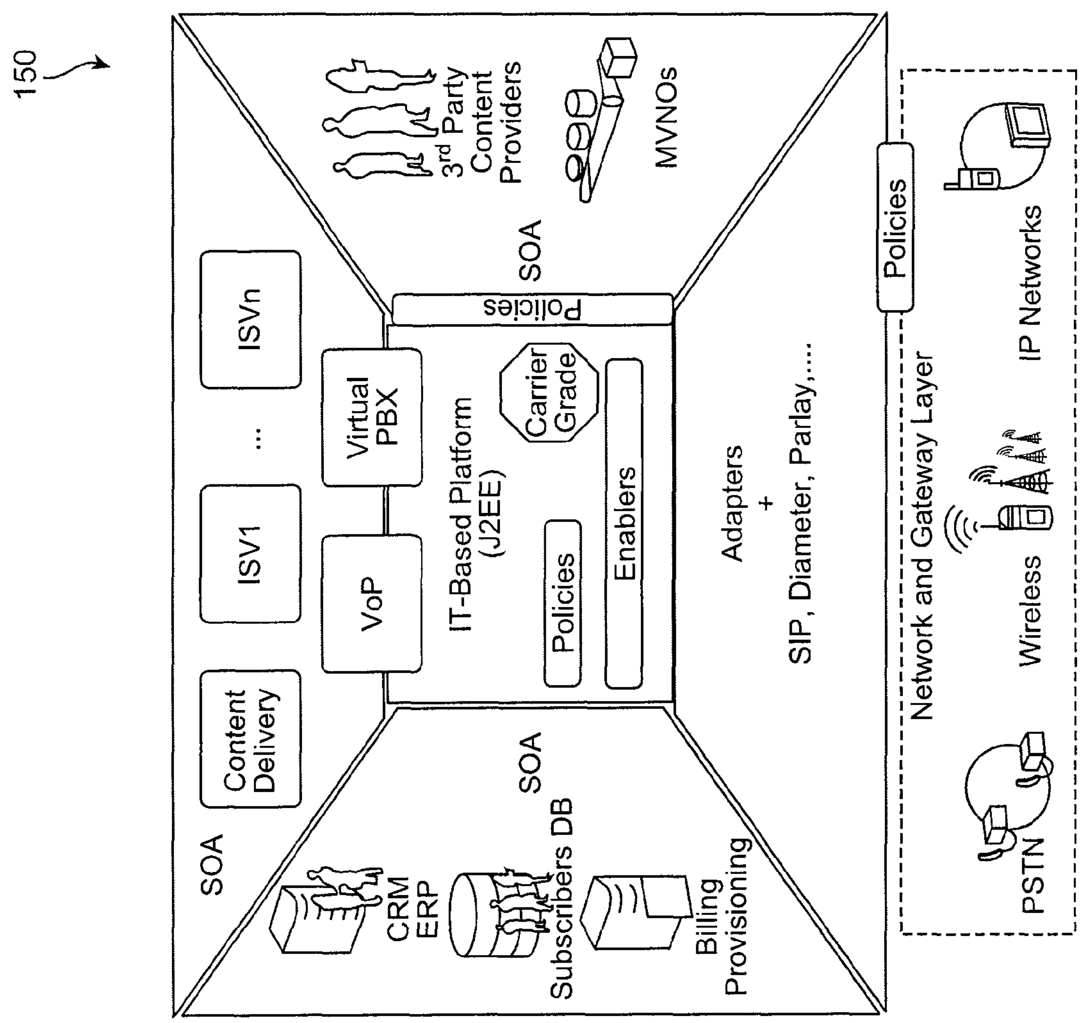

As discussed above, it is desirable for certain embodiments to function with existing technologies used by entities such as telecommunications companies. In one such embodiment, a SIP implementation takes advantage of a service delivery platform (SDP)-based architecture 100, such as is illustrated in FIGS. 1(*a*) and 1(*b*). In the exemplary architecture 100 of FIG. 1(*a*), the SDP 102 includes a horizontal, standards-based platform that abstracts the underlying network resources and follows a service-oriented architecture (SOA). Further information about such a service delivery platform is detailed in co-pending U.S. patent application Ser. No. 11/357,653, filed Feb. 16, 2006, entitled "FACTORIZATION OF CONCERNS TO BUILD A SDP (SERVICE DELIVERY PLATFORM)," which is hereby incorporated herein by reference. In one embodiment, the SDP utilizes a horizontal SOA platform based on the Java 2 Platform, Enterprise Edition (J2EE). The SDP includes a converged container based on Java Specification Requests JSR 116/289 and JSR 32, which includes SOA SIP AS, OSA AS, and telephony AS as a J2EE converged container. The SDP also exposes mobile, voice, and other communications enablers.

In FIG. 1(*b*), the SDP configuration 150 implements the desired functionality on top of an underlying J2EE core provided by the application server. A basic approach to providing a service delivery platform starts with a standards-based IT platform (e.g., J2EE) and makes the platform carrier grade, and extends beyond HTTP to protocols such as SIP, Diameter, and Parlay. To support the key protocols relevant to Telecommunications, for example, the SDP can provide support for SIP/ISC, Diameter and Parlay CORBA as well as adapters to messaging gateways. A standard approach can be used to build adapters to any other resource or protocol using JCA 1.5, for example. Enablers are provided as reusable components that abstract the network resources and standard northbound interfaces. IT/SOA then can be used to provide services such as revenue generating services, utilizing SOA-based policies and business rules (e.g., from third parties). The platform then can provide for SOA-based integration of OSS, BSS, and SDP. Exposure to third party content and service provider can be achieved by SOA to expose, integrate and enforce policies. SOA also can be used to also support and rationalize policy management and evaluation throughout the service provider environment.

The SDP can be thought of as a service layer solution that can be deployed on Oracle fusion middleware/OC4J as well as JBOSS, BEA Weblogic, and IBM Websphere, for example. While SIP is described as a first class citizen protocol besides HTTP, other protocols can be supported out of the box using a recipe for JCA 1.5 adapters to Parlay CORBA, Diameter, Messaging protocols etc. The J2EE container is converged (i.e. every object from SIP, HTTP, J2EE object etc can share context and interact with each others, when it makes sense) and carrier grade (details provided after). This includes the use of TimesTen and open source technologies like JGroups, and also can be able to rely on Tangosol Coherence to provide session replication and efficient distributed cache. The enabler framework includes an OSA AS (i.e. Parlay JR 5.1 J2EE local interface and Parlay X 2.1). These are realized on SIP and Parlay JCA and can be realized on others as well. A JSR 116 SIP servlet converged container (SIP AS) can be used for IETF and IMS (ISC) deployments. The SIP servlet container also can include all the necessary components to deploy a vanilla IETF SIP network (i.e. proxy router, edge server, registrar/location, STUN server, support for ENUM server, application dispatcher).

A set of enablers can be provided and implemented on SIP and Parlay. These enablers can include, for example, a presence enabler that follows OMA SIP/SIMPLE Presence, XDM and RLS enabler specifications. It is an out of the box IMS presence server and SIP/SIMPLE presence server. It can also aggregate presence from other networks (e.g. Parlay network presence) and provide northbound parlay X interface for application to use presence without participating to the presence network. Location data can be modeled as a presence attribute using an extensible presence data model. A multi-channel A2P and P2A messaging enabler can allow for sending and receiving messages in channels like SMS, MMS, email, IM (XMPP), SIP and others. Enablers can allow for multimedia and multiparty call control over SIP (internet and IMS) as well as Parlay. Enablers can provide service level charging that exposes online, offline charging balance inquiry and tracking, pre-rated charging etc integrated to Ro/Rf (AAA media gateways), Parlay and Oracle BRM. Others can be similarly integrated via JCA 1.5 adapters to be developed by third parties. A media server control enabler and voice access enablers that are the MRFC functions of MRF are able to control a wide variety of voiceXML servers, IVRs, announcement servers, and media servers (e.g. MSML, MSCML, MSCP, and MGCP). Protocols not available out of the box can be built on SIP AS or using JCA 1.5.

The whole platform can be used with identity management services. In one example, a UUP (unified user profile) built on a Virtual Directory offers an identity managed single view of the information about the subscribers (or other principles) from OSS (e.g. assets in inventory), BSS (e.g. bill and subscriptions), network (e.g. HSS via Sh), Dynamic information (e.g. presence or location) and any other service level specific information (e.g. credentials, and application or enabler data).

In one embodiment, the service delivery platform (SDP) is a standards-based horizontal platform that abstracts the underlying network resources, follows a service-oriented architecture, and realizes OSE. The platform can be a SOA platform based on J2EE, which includes a J2EE converged container and exposes various communication enablers. Enablers can include, for example, call control enablers and media server control enablers as discussed elsewhere herein. Further, interfaces can be exposed to applications and other enablers and resources for usage of various functionality. Some or all of the interfaces can be standard or standardizable, as is its behavior, such as may include OMA, Parlay, Parlay X, and WS components. For the purpose of the SDP, these enablers can provide various MVC (Mobile/Voice/Communications) functionality. The applications can be built using one or more enablers, and can add notions like a user interface (UI), user management, and charging, either in the code or via delegation and orchestration.

In order to provide the media stream control functionality in SIP, one approach involves adding to the header of a SIP message, such as an SIP call flow message. The header can be modified to explicitly provide for additional comments that can be used to provide the desired stream control. These options can include, for example, functionality such as fast forward, reverse, pause, and record, among other such options known for controlling video display or playback. In one embodiment, SIP can be used as currently implemented, with a call flow message that contains in the header of the message the requested operation. In another embodiment, a new explicit comment can be added to a SIP call flow message that supports this functionality. These capabilities can be added to a call control enabler or a media server enabler, for example, and can be accomplished directly in SIP AS as a SIP application (e.g., a SIP servlet like JSR 116 or JSR 289).

Figure 2A:
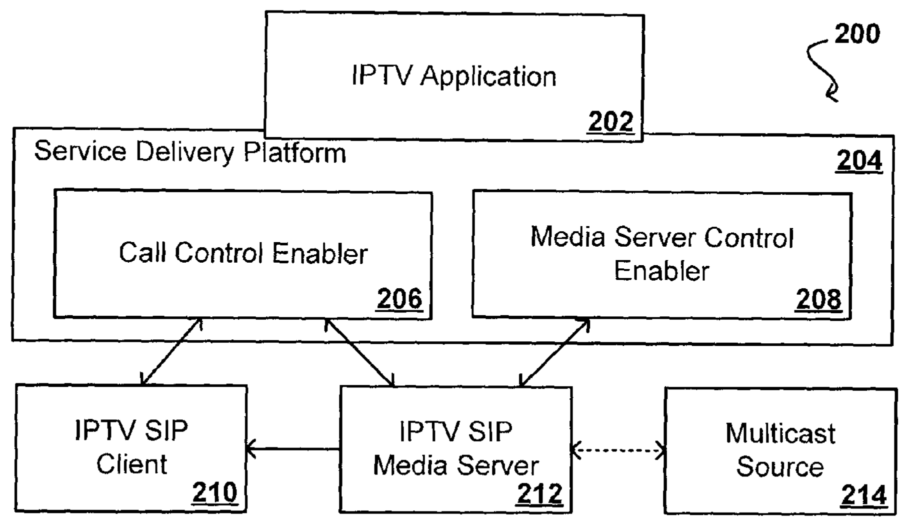
FIGS. 2(*a*), 2(*b*), and 2(*c*) illustrate deployment models that can be used in accordance with embodiments of the present invention.
Figure 2B:
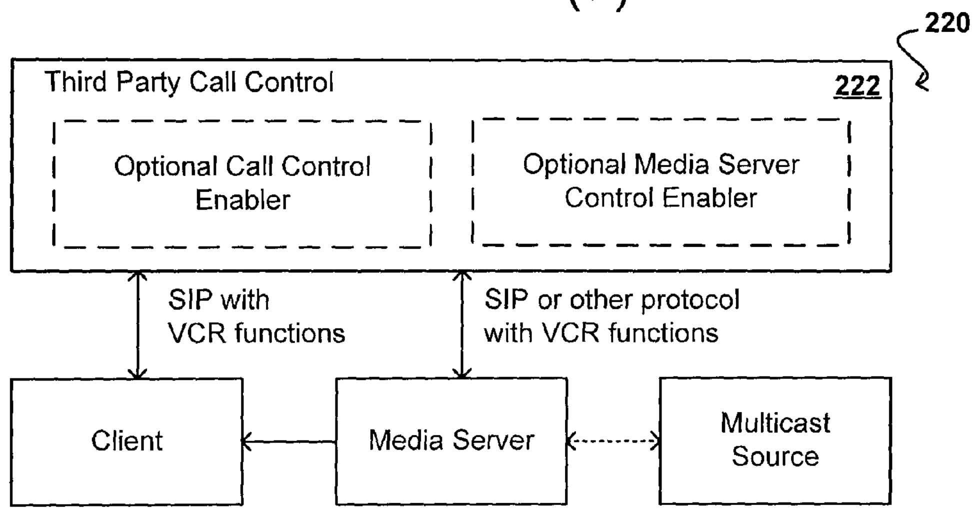
Figure 2C:
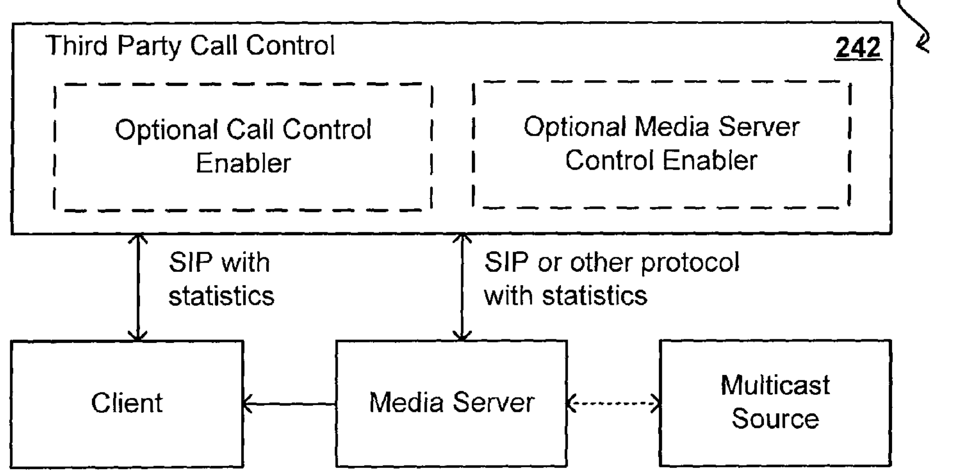

FIG. 2 illustrates an architecture 200 utilizing a call control enabler of a service delivery platform (SDP) in accordance with one embodiment. A description of such a call control enabler can be found, for example, in U.S. patent application Ser.No. 60/896,676, filed Mar. 23, 2007, entitled "Call Control Driven MVC Programming Model for Mixing Web and Call or Multimedia Applications," as well as U.S. patent application Ser. No. 11/949,930, filed Dec. 4, 2007, entitled "Call Control Enabler Abstracted from Underlying Network Technologies," and U.S. patent application Ser. No. 11/877,129, filed Oct. 23, 2007, entitled "Network Agnostic Media Control Enabler," each of which is hereby incorporated herein by reference. The notion of enablers and service layers is further described in U.S. patent application Ser. No. 11/357,653, filed Feb. 16, 2006, entitled "Factorization of Concerns to Build a SDP (Service Delivery Platform)", which is hereby incorporated herein by reference.

In one embodiment, VCR-style playback and control functionality is achieved by associating each new instruction (e.g., pause, fast forward) to a new SIP message such as PAUSE, FORWARD, REWIND, FAST FORWARD, FAST REWIND (as well as other speeds), MUTE, SKIP, RESTART FROM BEGINNING, RESTART FROM WHERE STOPPED, etc., along with a time argument (i.e., how much fast forward) or fast forward start until fast forward stop. In another approach, these instructions are added as arguments or header instructions of existing SIP messages such as INFO or NOTIFY. Errors, status, and other information can also be provided as extended instructions or passed as header/info messages. Which approach is selected does not matter, nor does the actual syntax or resulting flows. Many options exist, and for different technical reasons some may be preferable in certain situations. What is important is that the SIP messages and flows are able to convey these instructions to the media server, and based thereon the media server can appropriately modify the media stream or multimedia streams.

FIG. 2(*a*) illustrates an exemplary architecture 200 utilizing a call control enabler of a service delivery platform (SDP) in accordance with one embodiment. As used herein, the term "enabler" refers to a reusable service layer component that can be used to provide an intrinsic function for use by others (other enablers, applications, services, or authorized resources) through appropriate northbound interfaces. An enabler can access resources, devices, or OSS/BSS functions, for example, through the SDP via any mechanism appropriate for the resource. A call control enabler can be defined as an enabler that allows an application to perform base multimedia session handling. While such an approach relates to a third party multimedia call control case as discussed above, enablers are not necessary in all embodiments discussed herein. Even in embodiments using a SIP servlet in B2B UA mode an enabler is not necessary, including both a call control enabler and a media server control enabler. In FIG. 2(*a*), for example, the enabler could simply be a SIP servlet application, for example.

In FIG. 2(*a*), access to an IPTV application 202 is provided through the SDP 204. A SIP-enabled IPTV client 210, such as a television box or cell phone, can communicate with the IPTV application through the SDP. This system also includes a SIP-enabled media server 212 capable of receiving SIP messages and streaming content to the client 210 in response thereto. In one embodiment, the IPTV initiates the IPTV stream, while in another embodiment the client contacts the IPTV application to request initiation of a stream. The call control enabler 206 in either approach then can receive instructions from the IPTV application to establish a media session for the client. For example, the IPTV application can be a television listing application that has been programmed by a user of the client device to have a particular video program delivered to the client device at a particular time. In one example, the IPTV application can be programmed to deliver a program to be recorded locally at the client device, such as for a digital video recorded (DVR). In another example, a client device can instruct the media server to stream content to the client device at certain times of day, such as for a business that wants content streaming during business hours, or to stream a certain media file as soon as it becomes available. The call controller can send the initial SIP message to the media server to start the stream, and can send another message to the client device to be ready to receive the stream (thereby establishing a session). A media server control enabler 208 can send subsequent SIP messages to the media server to control the stream, such as to change the quality of the stream, engage in trick modes (e.g., fast forward or reverse), or stop the stream to the client at a certain time.

A media server control enabler for stream control can be any appropriate media server adapter (e.g., MSML, MSCML, MSCP, MRCP or another control protocol). In cases where SIP may not be involved, protocols such as MRCP, MOML, MGCP or MEGACO still can be used for control of the media server. As discussed, any protocol can be used with the media control enabler and it is not necessary for the enabler to be driving with SIP as southbound adapter. As a result, the application can use the media server control protocol to control the server with SIP or with non SIP adapters/protocols. Further, as the enabler is not required, these protocols also can be implemented directly. In such cases, however, the client still can have communicated to the application via SIP that there is a desired change to the delivery stream.

The IPTV SIP media server also can be in communication with at least one multicast source 214 in order to support multicasting of material to media servers when needed. In some embodiments, once the stream is established by the call control enabler the client can be able to send SIP requests directly to the media server in order to control the video stream. In other embodiments, there may be more than one third party application involved in the process, such as one application to initiate the stream and another to provide for stream control or quality.

FIG. 2(*b*) illustrates another deployment model 220, which utilizes a third party call control 222 that can operate with or without a media server control enabler and/or a call control enabler. In this case, the third party call control can operate with SIP or another protocol to provide VCR-type functionality. The third party call control can communicate with a client and server, which can send requests to the source. Such an approach also can be used to exchange statistics and/or feedback regarding the quality of the stream on the signaling exchanges (e.g., SIP). For example, FIG. 2(*c*) illustrates a deployment model 240 wherein the third party call control 242 communicates via SIP or another protocol with an exchange of statistics regarding the stream quality. Each party can send, receive, request, subscribe to, or publish statistics, observations, feedback, and other such information. This can allow such information to be sent or obtained when available to those who are interested, for example. The model for exchange can be, for example, INFO/NOTIFICATIONS or presence-based subscribe/notify statistics (e.g., SIP/SIMPLE). See also the description with respect to FIG. 4. The statistics may also go to another entity, e.g., in publish/subscribe mode a la presence, where a monitoring console can subscribe to the feedback/statistics.

Figure 3:
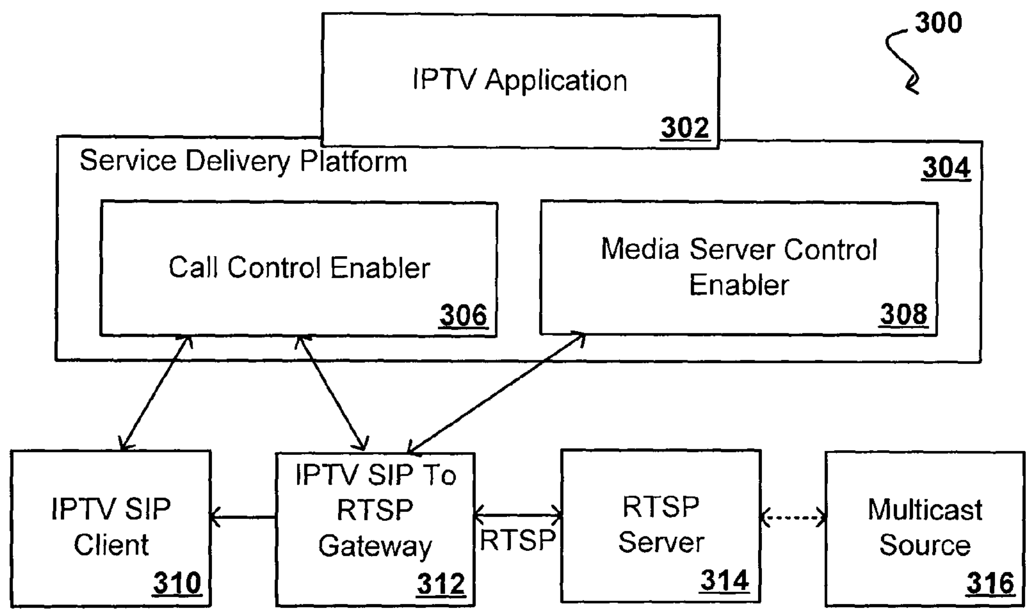
FIG. 3 illustrates components of a SIP-based IPTV system in accordance with one embodiment of the present invention.

FIG. 3 illustrates a system 300 in accordance with another embodiment, which provides for coexistence of solutions based on SIP and RTSP-based legacy solutions. The system in this embodiment takes advantage of RTSP servers 314 with a SIP to RTSP gateway 312, although other cases can be considered where, for example, the system goes from an in-band signaling to an out-band factored out signaling. Such a gateway is not a straight forward gateway, however, as the gateway would have to model more than simply client/server interactions. In this approach, a standard RTSP media server 314 can be used, and the SIP to RTSP Gateway 312 can allow the call control enabler to still initiate a session between the RTSP server 314 and the client 310 at the direction of the third party application 302, and can allow the media server control enabler 308 of the SDP 304 to control the stream from the media server 314 through the gateway 312, which can communicate with the server using RTSP. A multicast source 316 can still be used to multicast to the RTSP server. It should be understood that while many examples and embodiments discuss the invention with respect to streaming that other delivery or download modes can be used as would be apparent to one of ordinary skill in the art in light of the teachings and suggestions contained herein.

Figure 4:
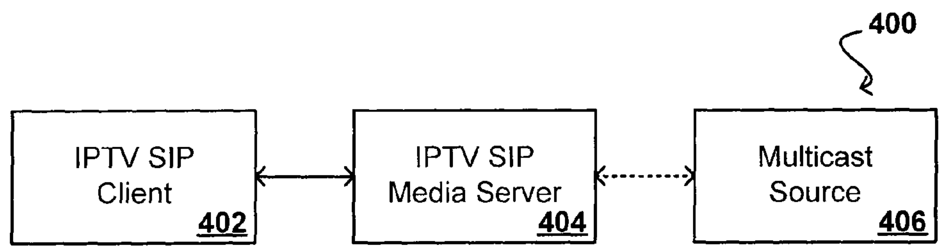
FIG. 4 illustrates components of a SIP-based IPTV system in accordance with one embodiment of the present invention.

FIG. 4 illustrates a system 400 in accordance with another embodiment, wherein the stream is controlled directly by a SIP-enabled client 402 in a peer-to-peer type arrangement, or in a client/server case, for example, without the need for a third party application, call enabler, media server control enabler, or SIP servlet/application implementations that perform equivalent functions. The client 402 is able to send SIP messages to the SIP-enabled IPTV media server 404 in order to initiate the stream and then control the stream. A multicast source 406 can be used a previously described. In this embodiment, because the client and IPTV server are able to initiate and control a stream directly, without a third party application, there can be no need to interact with a call control enabler, and there may also be no need for a media server control enabler of the service delivery platform. The SIP client 402 can send an initial SIP request for a stream directly to the media server 404, and can send any subsequent messages as desired to control the stream and perform any trick functionality (e.g., fast forward, etc.).

A system such as that of FIG. 4 also can allow for both end points to be controlled in a full duplex/bi-directional stream.

This can allow for functionality such as, for example, a real-time video call between the two end points.

It also can be desirable to provide statistics such as the quality of a particular video stream being delivered to a client, such is provided by RTSP-based systems. In order to provide such functionality, a SIP message can be generated that is used to describe the quality of the stream that has been received by the receiver (e.g., the SIP client). Upon receiving the message indicating the quality, the IPTV network or system can adjust the quality of service, bandwidth, etc., in order to adjust the quality to a determined level. There can be different qualities of service expected for different functions—such as a high quality of service for standard playback and a lower quality of service for fast forward playback, for example. Again, the system can provide VCR-style functionality for playback and control using a SIP-based approach.

Figure 5A:
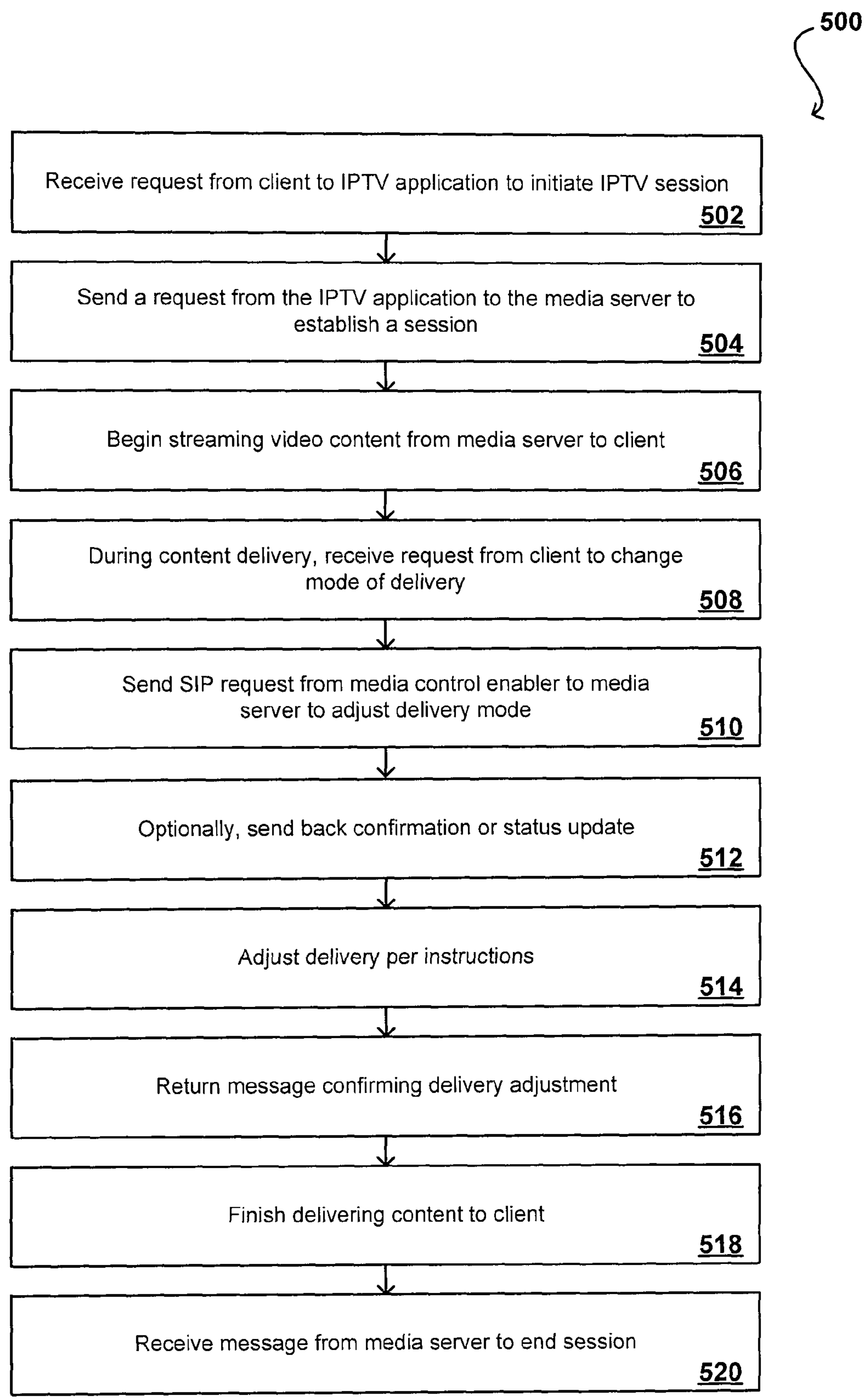
FIGS. 5(*a*), 5(*b*), and 5(*c*) illustrate steps of exemplary methods in accordance with one embodiment of the present invention.
Figure 5B:
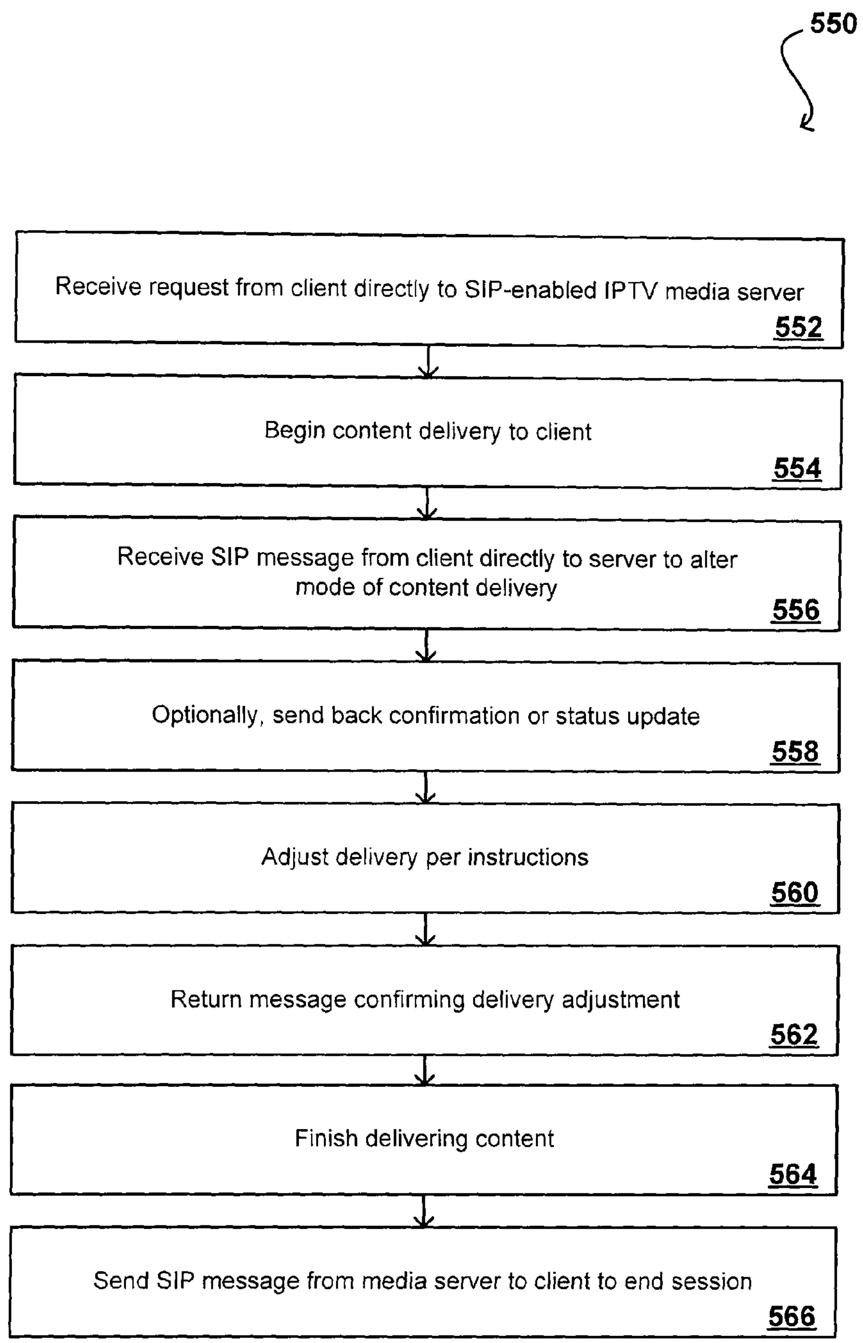
Figure 5C:
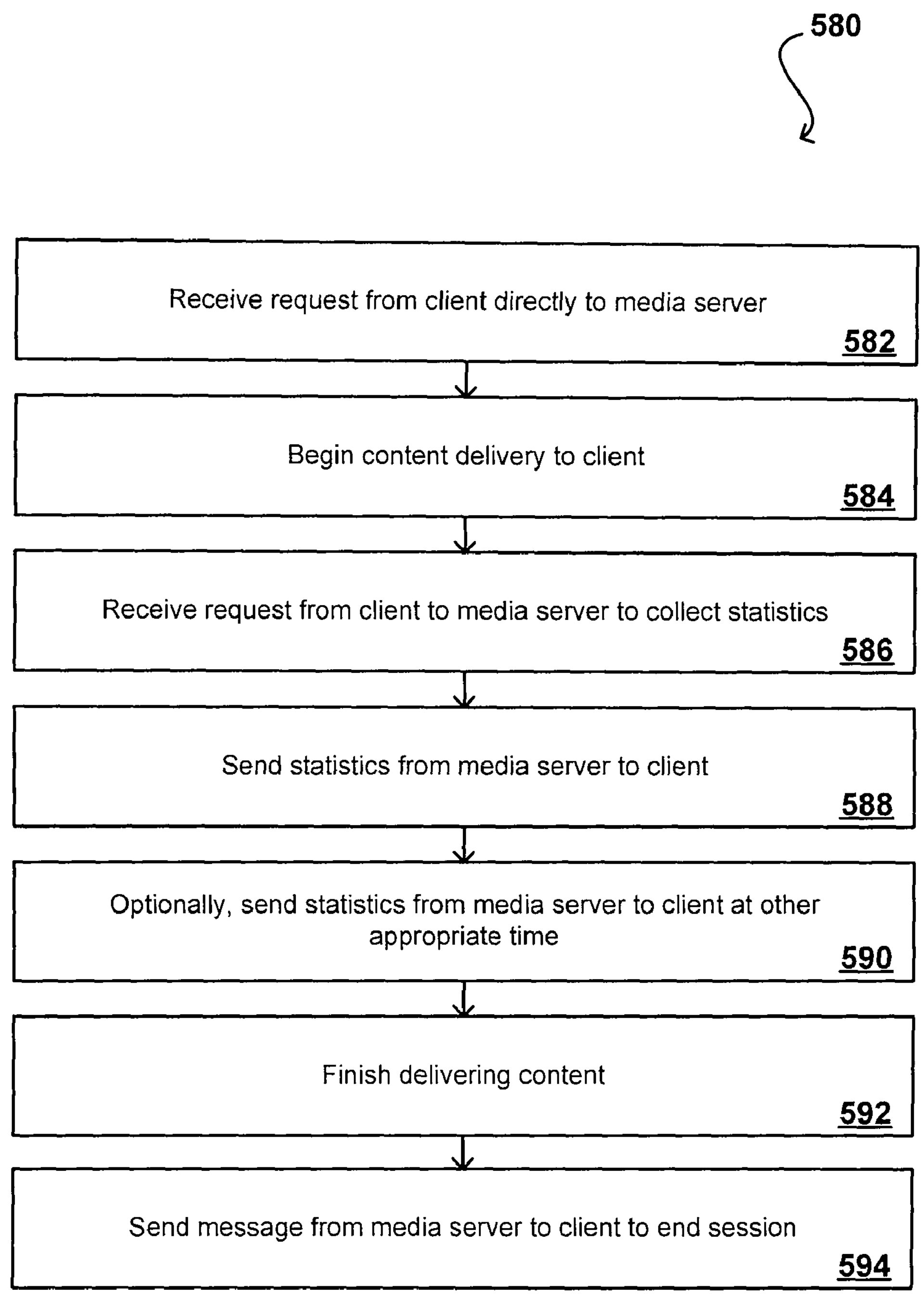

FIG. 5(*a*) illustrates steps of an exemplary method 500 for providing video content to a client in accordance with an embodiment that utilizes a third party IPTV application. In this example, a client sends a request to an IPTV application to request delivery of IPTV content 502. The IPTV application works through a call control enabler to send a SIP request to a SIP-enabled IPTV media server to establish a session between the client and the media server 504. The media server then can begin to stream the video content to the client 506. During the session, the client can send a SIP request through the call control enabler to place the transfer into a trick mode, such as a fast forward or reverse mode 508. A media server control enabler then can send a SIP request to the media server to enter into the appropriate trick mode 510. The same process can be used to return to regular playback mode, go into another trick mode, end a session, adjust a quality of service of the stream, etc. Optionally, the media server can send back confirmation or a status update, such as waiting or an error message 512. The media server adjusts the delivery appropriately 514 (e.g., fast forward per the instructions) and returns a SIP extension confirming that the delivery has been adjusted 516. Once the media server finishes delivering the content 518, the media server can send a SIP request to the IPTV application to end the session 520. In some embodiments, the call control enabler and media control enabler send SIP requests instead to a SIP-enabled RTSP gateway, which in turn passes on requests to an RTSP media server via RTSP, simulating/emulating a RSTP client.

FIG. 5(*b*) illustrates steps of an exemplary method 550 for providing video content to a client in accordance with an embodiment that utilizes a peer-to-peer style approach. In this example, a client sends a SIP request directly to a SIP-enabled IPTV media server to request delivery of IPTV content and establish an IPTV session 552. The media server then can begin to stream the video content to the client 554. During the session, the client can send a SIP request directly to the media server to alter the mode of transfer, such as from a regular delivery mode into a trick mode, such as a fast forward or reverse mode 556. The same process can be used to return to regular playback mode, go into another trick mode, end a session, adjust a quality of service of the stream, etc. Optionally, the media server can send back confirmation or a status update, such as waiting or an error message 558. The media server adjusts the delivery appropriately 560 (e.g., fast forward or reverse per the instructions) and returns a SIP extension confirming that the delivery has been adjusted 562. Once the media server finishes delivering the content 564, the media server can send a SIP request to the client to end the session 566.

FIG. 5(*c*) illustrates steps of an exemplary method 580 for providing video content to a client and collecting/passing statistics for the stream in accordance with an embodiment. This particular example is described using a peer-to-peer style approach, but it should be understood that statistics can be utilized similarly using different deployment models discussed herein. In this example, a client sends a request directly to a media server to request delivery of content and establish a session 582. The media server then can begin to stream the video content to the client 584. During the session, the client can send a request directly to the media server to request statistics for the stream, such as are used to determine a quality of service for the stream 586. The media server can send a response including the appropriate statistics 590. Optionally, such as in the case where the client subscribes to statistics information, the server can send a message including statistics at an appropriate time 592, such as where there is a change in the quality of service. Once the media server finishes delivering the content 594, the media server can send a request to the client to end the session 596.

Such an approach can be important, as many service providers are presently focusing their short or long term attention to IMS and its value proposition. It is envisioned that SIP-based networks ranging from vanilla SIP on the Internet to IMS will be widely deployed. Unfortunately, IPTV as currently envisaged is not SIP based or considered to be SIP friendly, as using currently technology SIP can at best be used to initiate a RTSP session and nobody knows how to fit SIP IPTV in the IMS architecture other than as underspecified MRFC/MRFP. It therefore is not only desirable to make IPTV work with SIP, but to make it easy to implement and understand using existing technology as described herein.

Embodiments of the present invention may be implemented in SIP using methods and systems described in co-pending U.S. patent application Ser. No. 11/383,024, entitled "SIP Routing Customization" filed on May 12, 2006 which is incorporated herein by reference in its entirety for all purposes. However, embodiments of the present invention are thought to be equally applicable to other signaling protocols. In another example, the interface of the call control enabler may use some Parlay or other interfaces. It should also be noted that, while described herein with regard to video on demand, embodiments in accordance with the invention are transposable to any multimedia sessions or exchanges, not just video deliver. In other cases, embodiments of the present invention can provide a multimedia session that can be directed to a generic processor that interacts with the media and extracts data then returns a result to the invoking or controlling application that then decides how to processed. The multimedia session may be SIP or another protocol. The media stream may be Real-time Transport Protocol (RTP), Real-Time Streaming Protocol (RTSP), Message Session relay Protocol (MSRP), or another protocol. Session control and media may be separated or combined.

Figure 6:
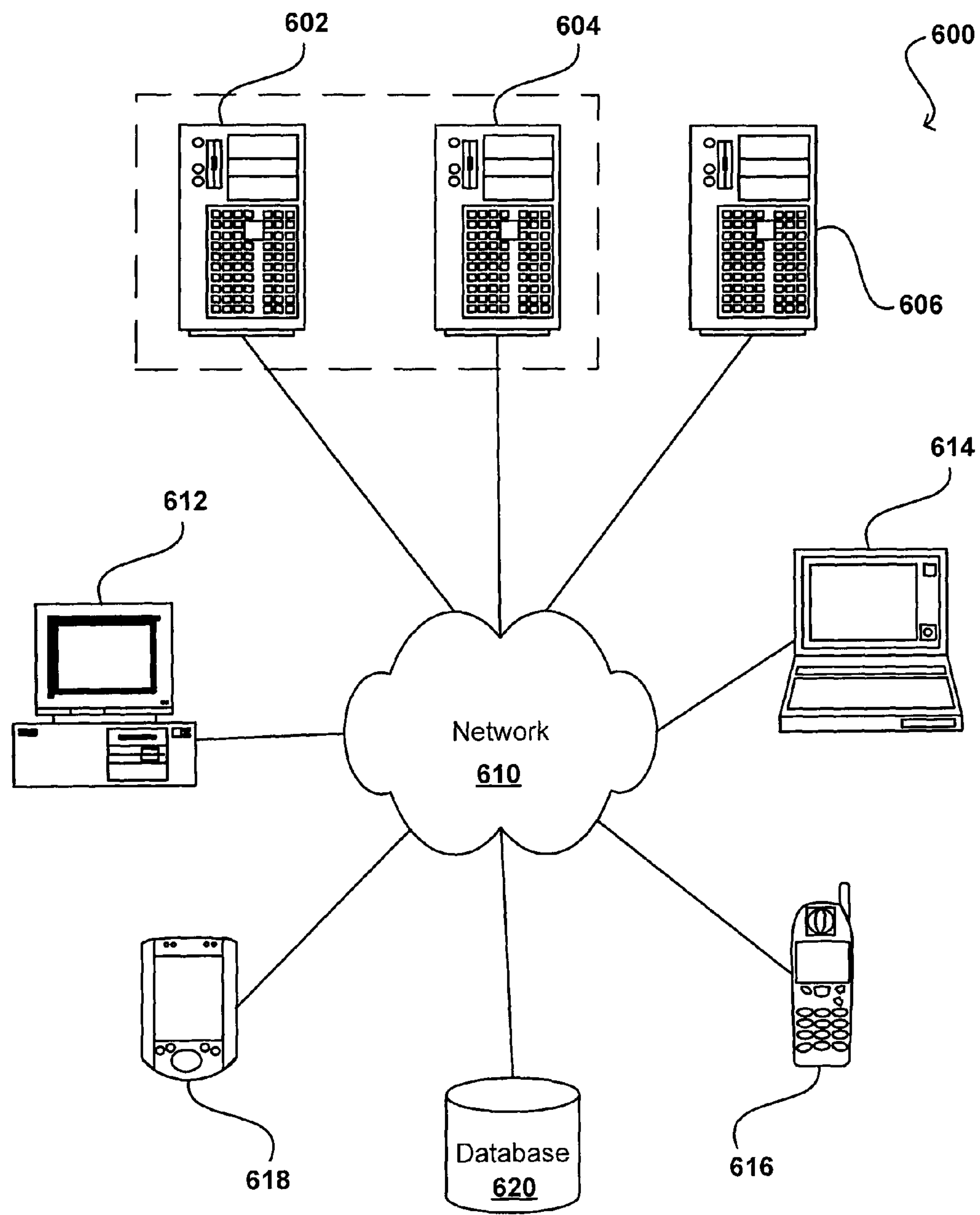
FIG. 6 illustrates components of a computer network that can be used in accordance with one embodiment of the present invention.

FIG. 6 is a block diagram illustrating components of an exemplary operating environment in which various embodiments of the present invention may be implemented. The system 600 can include one or more user computers, computing devices, or processing devices 612, 614, 616, 618, which can be used to operate a client, such as a dedicated application, web browser, etc. The user computers 612, 614, 616, 618 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 612, 614, 616, 618 may also have any of a variety of applications, including one or more development systems, database client and/or server applications, and Web browser applications. Alternatively, the user computers 612, 614, 616, 618 may be any other electronic device, such as a thin-client computer, Internet-enabled gaming system, and/or personal messaging device, capable of communicating via a network (e.g., the network 610 described below) and/or displaying and navigating Web pages or other types of electronic documents. Although the exemplary system 600 is shown with four user computers, any number of user computers may be supported.

In most embodiments, the system 600 includes some type of network 610. The network may can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 602, 604, 606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 606) may be dedicated to running applications, such as a business application, a Web server, application server, etc. Such servers may be used to process requests from user computers 612, 614, 616, 618. The applications can also include any number of applications for controlling access to resources of the servers 602, 604, 606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 612, 614, 616, 618. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 612, 614, 616, 618.

The system 600 may also include one or more databases 620. The database(s) 620 may reside in a variety of locations. By way of example, a database 620 may reside on a storage medium local to (and/or resident in) one or more of the computers 602, 604, 606, 612, 614, 616, 618. Alternatively, it may be remote from any or all of the computers 602, 604, 606, 612, 614, 616, 618, and/or in communication (e.g., via the network 610) with one or more of these. In a particular set of embodiments, the database 620 may reside in a storage-area network ("SAN") familiar to those skilled in the art. Similarly, any necessary files for performing the functions attributed to the computers 602, 604, 606, 612, 614, 616, 618 may be stored locally on the respective computer and/or remotely, as appropriate. In one set of embodiments, the database 620 may be a relational database, such as Oracle 10g, that is adapted to store, update, and retrieve data in response to SQL-formatted commands.

Figure 7:
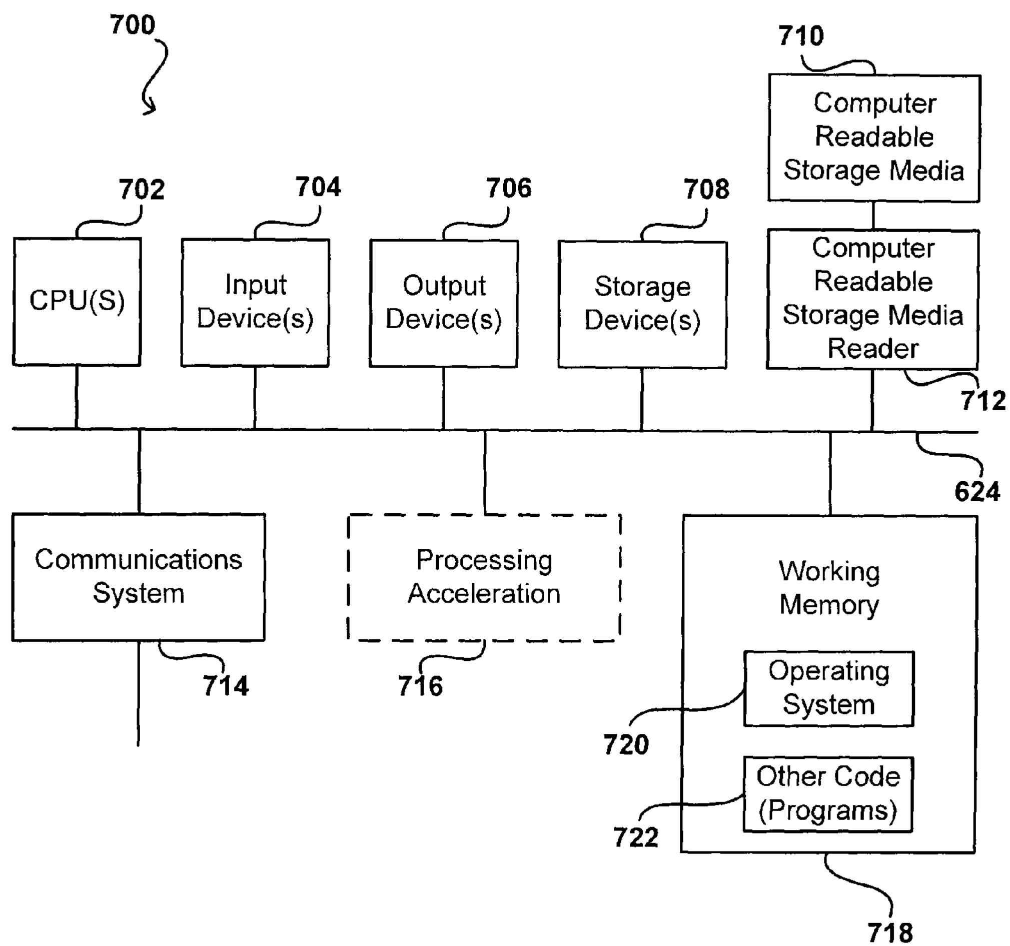
FIG. 7 illustrates components of a computerized device that can be used in accordance with one embodiment of the present invention.

FIG. 7 illustrates an exemplary computer system 700, in which various embodiments of the present invention may be implemented. The system 700 may be used to implement any of the computer systems described above. The computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The computer system 700 may also include one or more storage devices 708. By way of example, the storage device(s) 708 can include devices such as disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the computer system 700 may also include a processing acceleration unit 716, which can include a digital signal processor DSP, a special-purpose processor, and/or the like.

The computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing, storing, transmitting, and retrieving computer-readable information. The communications system 714 may permit data to be exchanged with the network and/or any other computer described above with respect to the system 700.

The computer system 700 may also comprise software elements, shown as being currently located within a working memory 718, including an operating system 720 and/or other code 722, such as an application program (which may be a client application, Web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for delivering multimedia content to a client, comprising:

a media server delivering multimedia content, wherein the media server sends and receives requests using Session Initiation Protocol (SIP); and a Service Delivery Platform (SDP) programmed to establish a session between the media server and a SIP-enabled client, the SDP further programmed to specify a delivery mode of the media server for the session, wherein the SDP receives an initial SIP request from the SIP-enabled client to initiate a session for delivery of content and sends the initial SIP request from the SDP to the media server, whereby the media server begins delivery of the multimedia content to the SIP-enabled client, and wherein the SDP receives a subsequent SIP request from the SIP-enabled client to alter a delivery mode of the content based on a VCR-like instruction from the SIP-enabled client and included in the subsequent SIP request, and sends a corresponding request from the SDP to the media server, whereby the media server alters the delivery mode of the content during delivery of the content and based on the VCR-like instruction to provide one or more of a plurality of VCR-like functions, wherein the plurality of VCR-like functions include at least a regular playback instruction, a pause instruction, a forward instruction, a fast forward instruction, and a reverse instruction.

2. A system according to claim 1, wherein:

the SDP includes a call control enabler for establishing the session and a media server control enabler for altering a delivery mode of the content.

3. A system according to claim 1, wherein:

the multimedia application is an Internet Protocol Television (IPTV) application, and the multimedia content is IPTV content.

4. A system according to claim 1, wherein the media server is a Real Time Streaming Protocol (RTSP) media server, further comprising:

a SIP-enabled RTSP gateway receiving the SIP requests from the SDP and sending a corresponding RTSP request to the media server in response thereto.

5. A system according to claim 1, wherein:

the SDP receives a message from the SIP-enabled client indicating a quality of service of the delivery of content, and sends a SIP request to the media server to alter a quality of service when the indicated quality of service falls below a threshold quality of service defined for the delivery mode.

6. A system according to claim 1, wherein:

information regarding the delivery of content is contained in a header of the initial SIP request and any subsequent SIP message, and contained in a SIP request specific to the delivery of content.

7. A system according to claim 1, further comprising:

a multicast server in communication with the media server.

8. A system according to claim 1, wherein the multimedia content is stored only on the media server and not stored on the client, the client being able to control delivery of the multimedia content using SIP.

9. A system according to claim 1, wherein the client is further able to send content to the media server using a delivery stream, such that bi-directional communication is enabled.

10. The system according to claim 1, wherein the VCR-like instructions further include as least a record instruction, a fast reverse instruction, a forward at selected speed instruction, a reverse at selected speed instruction, a restart from beginning instruction, a restart from stop instruction, and a stop instruction.

11. A method of delivering multimedia content to a client, the method comprising:

establishing by a service delivery module of a Service Delivery Platform SDP a session between a media server and a Session Initiation Protocol (SIP)-enabled client, wherein establishing includes specifying a delivery mode of the media server for the session, and wherein the SIP-enabled client and the media server send and receive requests using SIP;

receiving at the service delivery module of the SDP an initial SIP request from the SIP-enabled client to initiate a session for delivery of content;

sending the initial request from the service delivery module of the SDP to the media server, whereby the media server begins delivery of the multimedia content to the SIP-enabled client;

receiving at the service delivery module of the SDP a subsequent SIP request from the SIP-enabled client to alter a delivery mode of the content based on a VCR-like instruction from the SIP-enabled client and included in the subsequent SIP request; and sending a corresponding request from the service delivery module of the SDP to the media server, whereby the media server alters the delivery mode of the content during delivery of the content and based on the VCR-like instruction to provide one or more of a plurality of VCR-like functions, wherein the plurality of VCR-like functions include at least a regular playback instruction, a pause instruction, a forward instruction, a fast forward instruction, and a reverse instruction.

12. A machine-readable memory having stored thereon a sequence of instructions which, when executed by a processor, cause the processor to deliver multimedia content to a client by:

establishing by a service delivery module of a Service Delivery Platform SDP a session between a media server and a Session Initiation Protocol (SIP)-enabled client, wherein establishing includes specifying a delivery mode of the media server for the session, and wherein the SIP-enabled client and the media server send and receive requests using SIP;

receiving at the service delivery module of the SDP an initial SIP request from the SIP-enabled client to initiate a session for delivery of content;

sending the initial request from the service delivery module of the SDP to the media server, whereby the media server begins delivery of the multimedia content to the SIP-enabled client;

receiving at the service delivery module of the SDP a subsequent SIP request from the SIP-enabled client to alter a delivery mode of the content based on a VCR-like instruction from the SIP-enabled client and included in the subsequent SIP request; and sending a corresponding request from the service delivery module of the SDP to the media server, whereby the media server alters the delivery mode of the content during delivery of the content and based on the VCR-like instruction to provide one or more of a plurality of VCR-like functions, wherein the plurality of VCR-like functions include at least a regular playback instruction, a pause instruction, a forward instruction, a fast forward instruction, a reverse instruction, a record instruction, a fast reverse instruction, a forward at selected speed instruction, a reverse at selected speed instruction, a restart from beginning instruction, a restart from stop instruction, and a stop instruction.

* * * * *

UNITED STATES PATENT AND TRADEMARK OFFICE

CERTIFICATE OF CORRECTION

PATENT NO. : 8,161,171 B2
APPLICATION NO. : 11/943101
DATED : April 17, 2012
INVENTOR(S) : Maes It is certified that error appears in the above-identified patent and that said Letters Patent is hereby corrected as shown below:

On page 3, in column 2, under “Other Publications”, line 25, delete “SIPSerylet” and insert -- SIPServlet --, therefor.

In column 1, line 66, delete “ITPV” and insert -- IPTV --, therefor.

In column 6, line 30, delete “Ser.No.” and insert -- Ser. No. --, therefor.

In column 9, line 44, delete “RSTP” and insert -- RTSP --, therefor.

In column 11, line 26, delete “GRPS,” and insert -- GPRS, --, therefor.

In column 14, line 22, in Claim 10, delete “as least” and insert -- at least --, therefor.

Signed and Sealed this
Twenty-fourth Day of July, 2012

David J. Kappos
*Director of the United States Patent and Trademark Office*